UNITED STATES PATENT OFFICE.

WILHELM HIEMENZ AND WALTER KROPP, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PHARMACEUTICAL PRODUCT.

1,026,914.     Specification of Letters Patent.     Patented May 21, 1912.

No Drawing.     Application filed September 21, 1911. Serial No. 650,525.

*To all whom it may concern:*

Be it known that we, WILHELM HIEMENZ and WALTER KROPP, doctors of philosophy, chemists, citizens of the German Empire, residing at Elberfeld, Germany, have invented a new Pharmaceutical Product, of which the following is a specification.

Our invention concerns the production of the hitherto unknown isoborneol ester of the dibromo-dihydrocinnamic acid of the formula

$$C_6H_5\text{—}CHBr\text{—}CHBr\text{—}COO.C_{10}H_{17}$$

which has proved to be a valuable sedative, an average dose being ½ gram.

The process for its production consists in treating the cinnamic acid isoborneol ester with bromin.

In order to illustrate our new process more fully the following example is given, the parts being by weight:—234 parts of cinnamic acid isoborneol ester are dissolved in 1000 parts of carbon tetrachlorid and a mixture of 170 parts of bromin and 400 parts of carbon tetrachlorid is added to this solution which is stirred and well cooled. The liquid is distilled off and the residue is recrystallized from alcohol. The isoborneol ester of the dibromo-dihydrocinnamic acid is thus obtained in the shape of colorless and tasteless brilliant crystals melting at 69° C.

We claim:—

The herein described isoborneol ester of the dibromo-dihydrocinnamic acid, which crystallizes from alcohol in the shape of white brilliant crystals melting at 69° C., difficultly soluble in water and being a valuable sedative, substantially as described.

In testimony whereof we have hereunto set our hands in the presence of two subscribing witnesses.

WILHELM HIEMENZ. [L. S.]
    WALTER KROPP. [L. S.]

Witnesses:
    L. NUFER,
    A. NUFER.